United States Patent [19]
Hultgren et al.

[11] Patent Number: 5,755,556
[45] Date of Patent: May 26, 1998

[54] TURBOMACHINE ROTOR WITH IMPROVED COOLING

[75] Inventors: Kent Goran Hultgren, Winter Park; Leroy Dixon McLaurin, Winter Springs; Oran Leroy Bertsch, Titusville; Perry Eugene Lowe, Oviedo, all of Fla.

[73] Assignee: Westinghouse Electric Corporation, Pittsburgh, Pa.

[21] Appl. No.: 649,507

[22] Filed: May 17, 1996

[51] Int. Cl.⁶ ............................................ F04D 29/58
[52] U.S. Cl. ............................ 416/96 R; 60/39.75
[58] Field of Search ............................ 416/95, 96 R; 60/39.75

[56] References Cited

U.S. PATENT DOCUMENTS

| | | | |
|---|---|---|---|
| 3,945,758 | 3/1976 | Lee | 415/144 |
| 4,021,138 | 5/1977 | Scaizo et al. | |
| 4,113,406 | 9/1978 | Lee et al. | 415/115 |
| 4,820,116 | 4/1989 | Hovan et al. | 416/95 |
| 5,318,404 | 6/1994 | Carreno et al. | 416/95 |

FOREIGN PATENT DOCUMENTS

| | | |
|---|---|---|
| 2 174 497 | 10/1973 | France . |
| 573 481 | 1/1933 | Germany . |
| 744 859 | 2/1953 | Germany . |
| 19 63 364 | 7/1970 | Germany . |
| 482 914 | 12/1969 | Switzerland . |
| 744 856 | 2/1956 | United Kingdom . |
| 913 167 | 12/1962 | United Kingdom . |
| 2 189 845 | 4/1987 | United Kingdom . |

*Primary Examiner*—John T. Kwon
*Attorney, Agent, or Firm*—D. G. Maire

[57] ABSTRACT

A gas turbine rotor has an essentially closed loop cooling air scheme in which cooling air drawn from the compressor discharge air that is supplied to the combustion chamber is further compressed, cooled, and then directed to the aft end of the turbine rotor. Downstream seal rings attached to the downstream face of each rotor disc direct the cooling air over the downstream disc face, thereby cooling it, and then to cooling air passages formed in the rotating blades. Upstream seal rings attached to the upstream face of each disc direct the heated cooling air away from the blade root while keeping the disc thermally isolated from the heated cooling air. From each upstream seal ring, the heated cooling air flows through passages in the upstream discs and is then combined and returned to the combustion chamber from which it was drawn.

11 Claims, 4 Drawing Sheets

TURBOMACHINE ROTOR WITH IMPROVED COOLING

REFERENCE TO GOVERNMENT CONTRACTS

Development for this invention was supported in part by U.S. Department of Energy contract DE-AC2193MC30247. Accordingly, the U.S. government may have certain rights in the invention.

BACKGROUND OF THE INVENTION

The present invention relates to a rotor for a turbomachine. More specifically, the present invention relates to a gas turbine rotor having an improved cooling air scheme that allows for a closed loop cooling air path.

The turbine section of a gas turbine includes a rotor that is comprised of a series of disks to which blades are affixed. Hot gas from the combustion section flows over the blades, thereby imparting rotating power to the rotor shaft. In order to provide maximum power output from the gas turbine, it is desirable to operate with gas temperatures as high as possible. In order to avoid exposing the highly stressed blade roots, as well as the disc portions to which the blades are secured, to the hot gas, side plates have traditionally been installed that act as baffles to isolate the blade root and disc faces from the hot gas, as shown, for example, in U.S. Pat. Nos. 3,945,758 (Lee) and 4,113,406 (Lee et al.). Nevertheless, operation at high gas temperatures requires cooling the blades and discs.

Traditionally, such cooling was accomplished by bleeding cooling air from the compressor discharge air. A portion of this cooling air was directed through passages in the blades and discs. Another portion flowed through the stationary turbine vanes into the cavities formed between the faces of adjacent discs. After cooling the discs, blades, and vanes, the heated cooling air was typically discharged to the hot gas flowing through the turbine section. However, although the cooling air eventually mixed with the hot gas expanding in the turbine, since it bypassed the combustion process the work recovered from the expansion of the compressed cooling air was much less than that recovered from the expansion of the compressed air heated in the combustors. In fact, as a result of losses due to pressure drop and mechanical efficiency, the work recovered from the cooling air is less than that required to compress the air in the compressor. In addition, discharging the cooling air into the hot gas flow results in aerodynamic losses as the cooling air mixes with the hot gas.

Notwithstanding the use of cooling air, traditionally, the discs became so hot during operation that it was necessary to manufacture them from expensive alloys that have exceptional strength at high temperature, such as nickel based alloys, rather than less expensive low alloy steels.

It is therefore desirable to provide a cooling scheme for a gas turbine rotor that avoids the need to dump the spent cooling air to the hot gas flowing through the turbine and that provides effective cooling of the rotor, thereby making it possible to use discs manufactured from less expensive materials.

SUMMARY OF THE INVENTION

Accordingly, it is the general object of the current invention to provide a cooling scheme for a gas turbine rotor that avoids the need to dump the spent cooling air to the hot gas flowing through the turbine and that provides effective cooling of the rotor.

Briefly, this object, as well as other objects of the current invention, is accomplished in a turbo-machine comprising a rotor over which a working fluid flows. The rotor comprises (i) a plurality of blades exposed to the working fluid, (ii) a first member to which the blades are secured, the first member having first and second faces on opposite sides thereof, (iii) a first cooling fluid flow path having an inlet for receiving cooling fluid and an outlet for discharging the cooling fluid therefrom after the cooling fluid has flowed through the first cooling fluid flow path, (iv) a first seal ring extending circumferentially around the rotor adjacent the first face, the first seal ring having first cooling fluid directing means for directing the cooling fluid to the first cooling fluid flow path inlet for flow therethrough, and (v) a second seal ring extending circumferentially around the rotor adjacent the second face, the second seal ring having second cooling fluid directing means for directing the cooling fluid discharged from the first cooling fluid flow path outlet away from the first member.

According to a preferred embodiment of the invention, the turbo-machine further comprises a combustor for heating the working fluid and a third cooling fluid directing means for directing the discharged cooling fluid from the second cooling fluid directing means to the combustor.

DESCRIPTION OF THE PREFERRED EMBODIMENT

Figure 1:
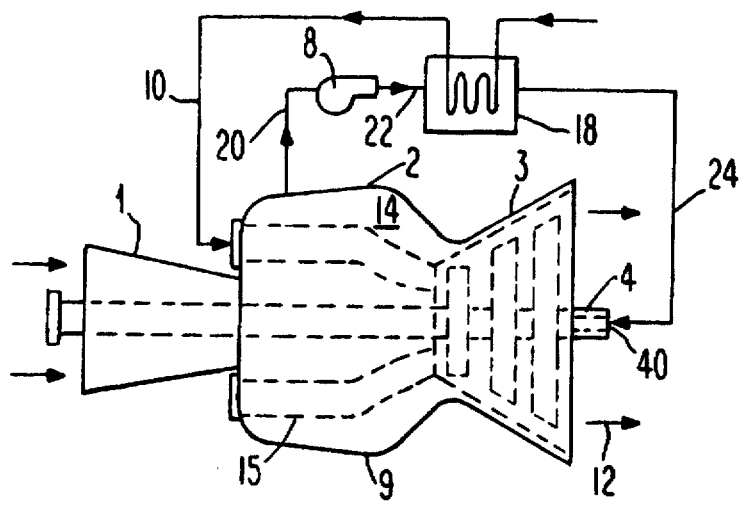
FIG. 1 is a schematic diagram of a gas turbine according to the current invention.

Referring to the drawings, there is shown in FIG. 1 a schematic diagram of a gas turbine. The major components of the gas turbine are a compressor section 1, a combustion section 2, a turbine section 3, and a centrally disposed rotor 4 that extends through the three sections. The compressor section 1 is typically comprised of cylinders that enclose alternating rows of stationary vanes and rotating blades. The combustion section 2 is comprised of an approximately cylindrical shell 9 that forms a chamber 14 that encircles a portion of the rotor 4. A plurality of combustors 15 are contained within the chamber 14 and connected to the turbine section 3. Fuel 10, which may be in liquid or gaseous form—such as distillate oil or natural gas—enters each combustor 15 through a fuel nozzle and is burned therein so as to form a hot compressed gas 12 that forms the working fluid for the turbine section 3.

The turbine section 3 is typically comprised of an outer cylinder that encloses an inner cylinder. The inner cylinder encloses rows of stationary vanes and rows of rotating blades. The stationary vanes are affixed to the inner cylinder and the rotating blades are affixed to discs that form a portion of the turbine section of the rotor.

In operation, the compressor section 1 inducts ambient air and compresses it. The compressed air from the compressor section 1 enters the chamber 14 where a first portion of the compressed air is distributed to each of the combustors 15.

In the combustors 15, the fuel 10 is mixed with the compressed air and burned, thereby forming the hot compressed gas 12. The hot compressed gas 12 flows through the rows of stationary vanes and rotating blades in the turbine section 3, wherein the gas expands and generates power that drives the rotor 4. The expanded gas is then exhausted from the turbine 3.

A second portion 20 of the compressed air from the compressor 1 is extracted from the chamber 14 by means of a pipe connected to the shell 9. Consequently, the compressed air 20 bypasses the combustors 15 and forms cooling air for the rotor 4. Alternatively, the cooling air 20 may be extracted from one or more intermediate stages within the compressor section 1. In any event, the pressure of the cooling air 20 is preferably increased by a boost compressor 8. The further pressurized cooling air 22 is then preferably cooled by an external cooler 18. In the preferred embodiment, the cooler 18 is supplied with the fuel 10 so that heat transferred from the cooling air 20 heats the fuel 10 and is thereby returned to the cycle.

From the cooler 18, the cooled pressurized cooling air 24 is then directed to the aft end of the turbine rotor 4, where in enters a rotor cooling air inlet 40 and flows in the upstream direction through passages in the rotor. As used herein, the terms "upstream" and "downstream" refer to the direction of flow of the hot gas 12 through the turbine-section 3. Thus, as seen in FIGS. 1 and 2, the upstream direction is from right to left and the downstream direction is from left to right.

Figure 2:
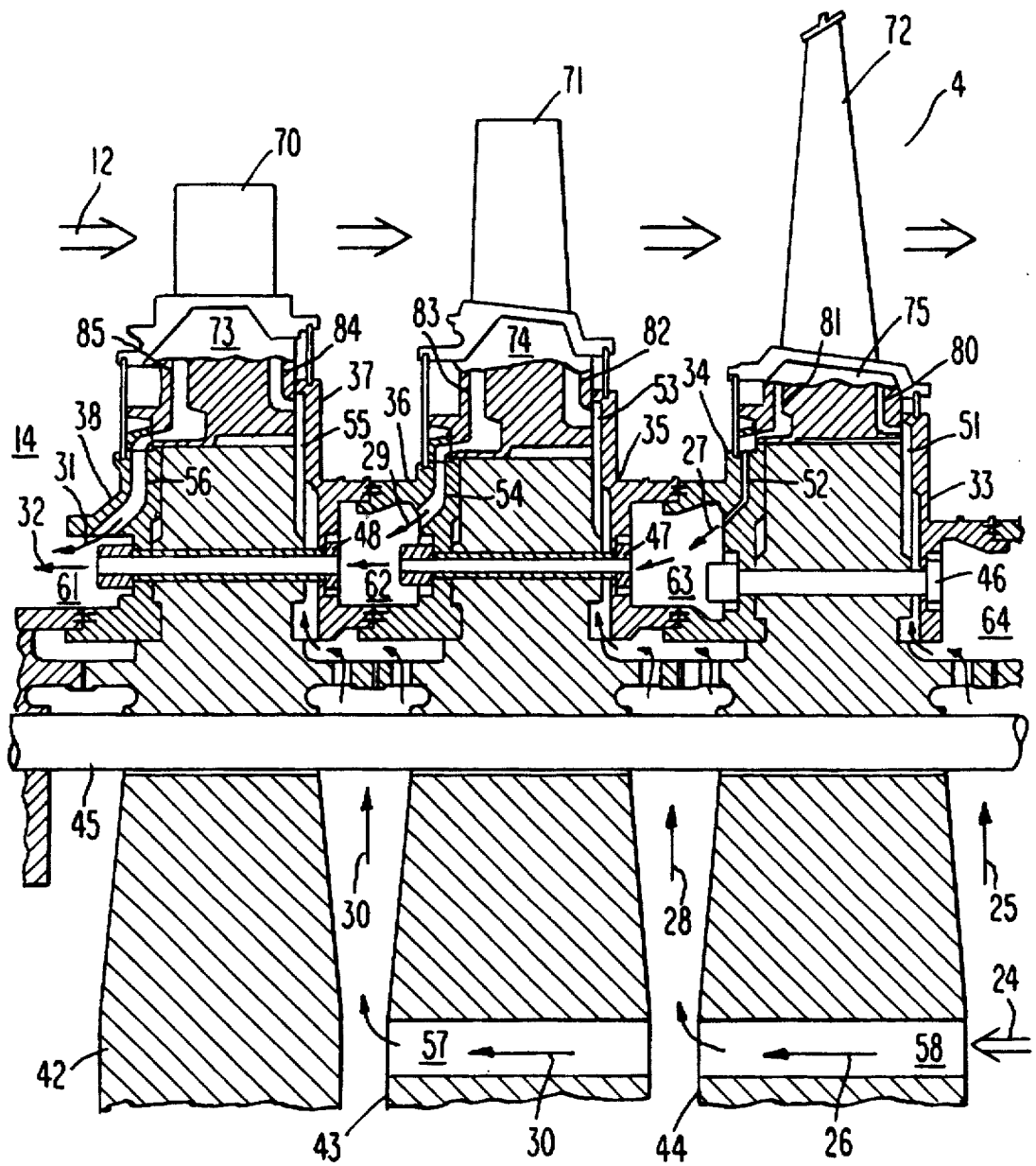
FIG. 2 is a longitudinal cross-section through the turbine rotor of the gas turbine shown in FIG. 1.

As shown in FIG. 2, the turbine portion of the rotor 4 is comprised of first, second and third rows of discs 42–44 joined together by bolts 45. First, second and third rows of rotating blades 70–72 are secured to the periphery of the discs 42–44 by root portions 73–75 of the blades, for example, by means of a fir-tree attachment in which a serrated blade root slidably engages a serrated slot in the disc. Cooling air passages 80–85 are formed in the blade roots 73–75. These cooling air passages direct cooling air to additional cooling air passages formed in the airfoil portions of the blades. As is well known in the art, the blade airfoil cooling air passages may take a variety of forms, such as a serpentine arrangement. Preferably, cooling air is not discharged from the blade cooling passages to the hot gas 12, so that substantially all of the cooling air that enters the rotor 4 is eventually returned to the chamber 14, as discussed further below.

According to an important aspect of the invention, seal rings 33–38 are disposed adjacent to, and secured to, the upstream and down stream faces of each of the discs 42–44. The seal rings 33–38 extend 360° circumferentially around the rotor 4. As discussed below, the downstream seal rings 33, 35, and 37 direct cooling air over the downstream disc faces and then to the blade root inlet cooling air passages 80, 82, and 84. The upstream seal rings 34, 36, and 38 receive the heated cooling air from the blade root outlet cooling air passages 81, 83, and 85 and direct it away from the discs 42–44.

As also shown in FIG. 2, from the rotor cooling air inlet 40, the cooling air 24 is divided into two streams 25 and 26. Cooling air 25 forms the cooling air for the third row disc 44 and blades 72. After flowing through holes 58 formed in the third row disc 44, cooling air 26 is further divided into streams 28 and 30. As discussed below, cooling air 28 forms the cooling air for the second row disc 43 and blades 71. Cooling air 30 flow through holes 57 in the second row disc 43 and forms the cooling air for the first row disc 42 and blades 70.

Turning first to the cooling of the third row, the cooling air 25 for the third row enters a cavity 64. From the cavity 64 the cooling air 25 is directed by downstream seal ring 33 through a cooling air passage 51 formed between the downstream face of the third row disc 44 and downstream seal ring, thereby cooling the downstream disc face. Passage 51 then directs the cooling air 25 to the inlet cooling air passages 80 formed in the third row blade roots 75. After flowing through the third row blades 72, from which it absorbs additional heat, thereby cooling the airfoil and root portions of the blades, the heated cooling air 27 flows through seal bars, discussed further below with respect to the second row cooling. From the seal bars, the cooling air then flows through passages 52 in the upstream seal ring 34 to a cavity 63 formed in part by outer and inner arms 66 and 67 that extend from the second row downstream seal ring, as shown best in FIG. 3.

Figure 3:
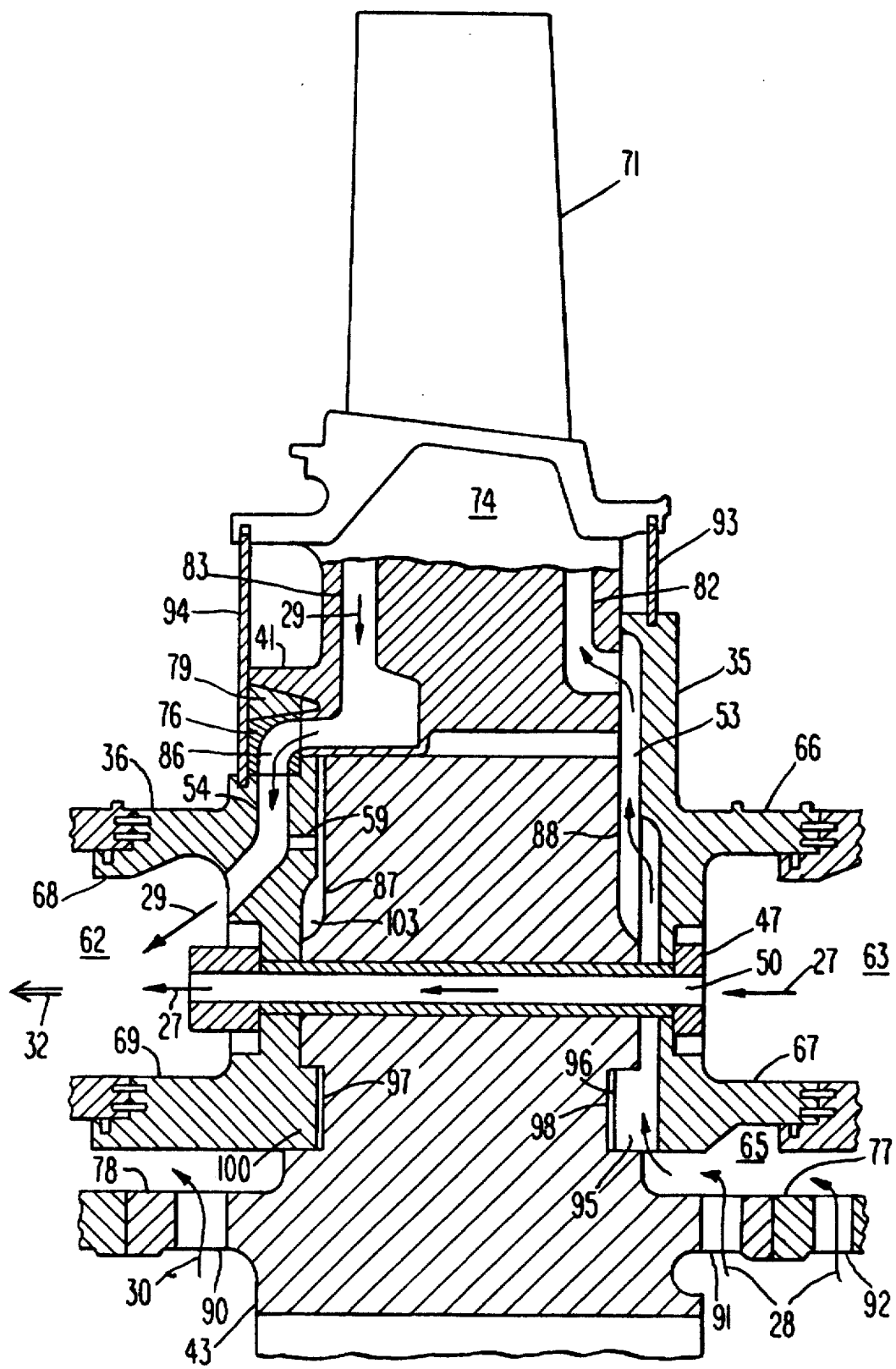
FIG. 3 is an enlarged view of the turbine rotor shown in FIG. 2 in the vicinity of the second row.

As shown in FIG. 3, from the cavity 63, the heated cooling air 27 from the third row then flows through the second row disc 43 via cooling air passages 50 formed in hollow bolts 47 that secure the upstream and downstream seal rings 36 and 35, respectively, to the second row disc 43. From the passages 50, the heated cooling air 27 then enters a cavity 62 formed in part by outer and inner arms 68 and 69, respectively, that extend from the second row upstream seal ring 36.

Turning now to the cooling of the second row, and still referring to FIG. 3, the cooling air 28 for the second row disc 43 flows from the space between the second and third row discs through holes 91 in the downstream arm 77 of the second row disc 43, as well as through holes 92 formed in the upstream arm of the third row disc 44. From the holes 91 and 92, the cooling air 28 flows into a cavity 65 formed in part by the downstream arm 67 of the second row downstream seal ring 35 and the downstream arm 77 of the second row disc 43. From the cavity 65, the cooling air 28 is directed by the downstream seal ring 35 through a passage 53 formed between the downstream face 88 of the second row disc 43 and the downstream seal ring.

Figure 4:
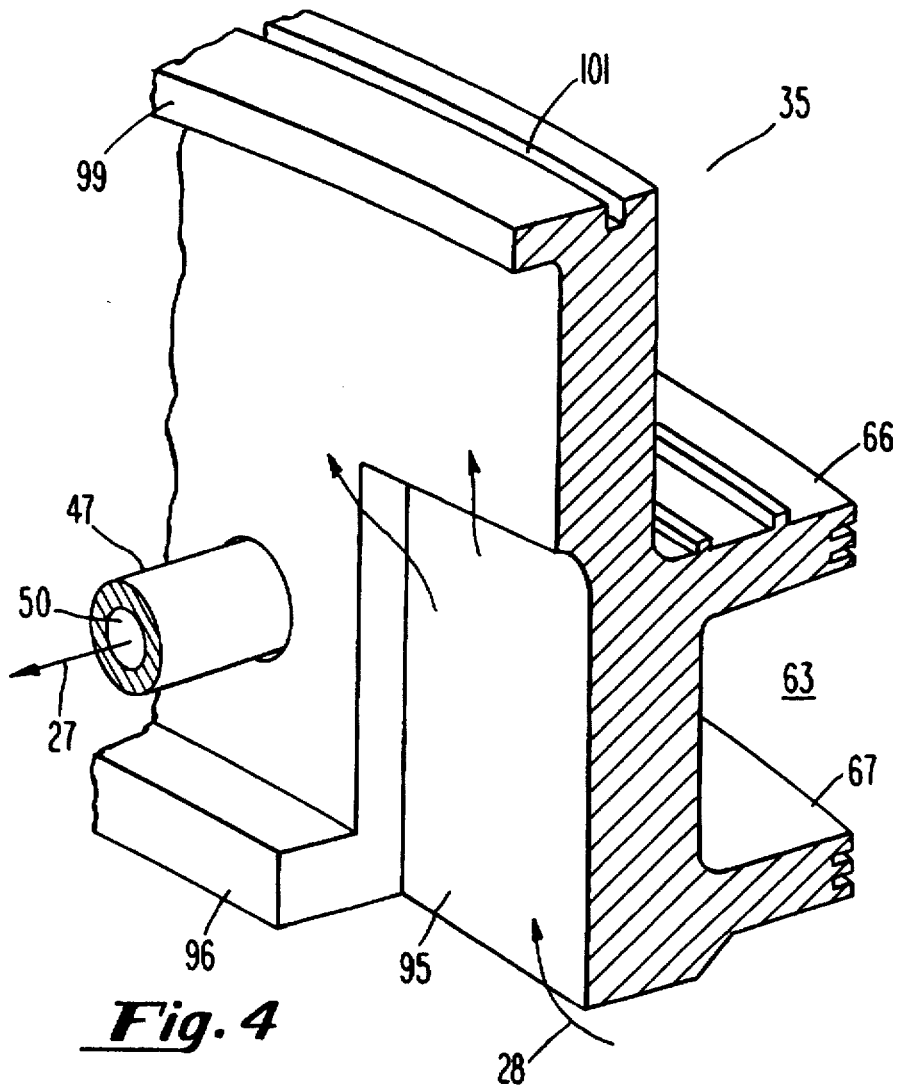
FIG. 4 is an isometric view, in cross-section, of the downstream seal ring shown in FIG. 3.

As shown best in FIG. 4, the initial portion of the passage 53 is formed by locally relieved portions 95 that are cut into the face of the seal ring 35 and that are distributed around its circumference. The portions of the seal ring face between the reliefs 95 form contact areas by which the seal ring 35 rests against the disc face 88, as shown in FIG. 3. The unrelieved portions also form a spigot 96 that rests inside a groove 98 cut in the disc face 88 that allows the seal ring 35 to be accurately located on the disc 43. An upper face 99 at the periphery of the seal ring 35, shown in FIG. 4, rests against the downstream faces of the disc and blade roots to seal the end of the passage 53, as shown in FIG. 3. A groove 101 cut in the periphery of the seal ring 35, shown best in FIG. 4, secures a downstream sideplate 93, as shown in FIG. 3.

Figure 5:
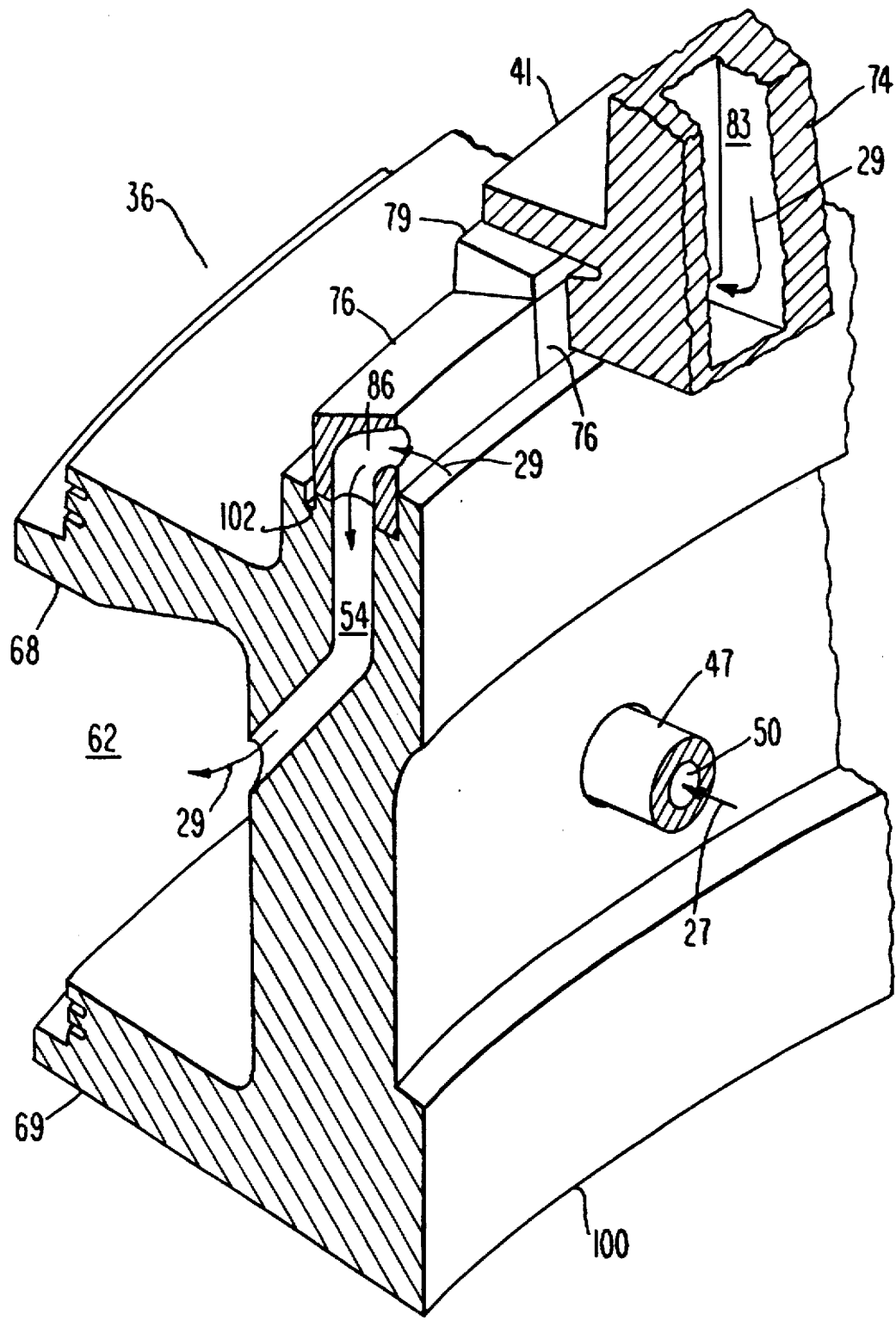
FIG. 5 is an isometric view, in cross-section, of the upstream seal ring shown in FIG. 3.

As also shown in FIG. 3, as the cooling air 28 flows through the passage 53 it sweeps over the disc face 88, which is cooled thereby. From the passage 53 the cooling air 28 enters the inlet cooling air passages 82 of the second row blade roots 74. After flowing through and cooling the blade roots and air foils, as previous discussed, the heated cooling air 29 is discharged from the blade roots 74 by the blade root outlet cooling air passages 83. From the outlet passages 83, the heated cooling air 29 flows into passages 86 formed in seal bars 76 that are disposed between the upstream sideplates 94 and the upstream face of the blade roots 74. As shown in FIG. 5, the seal bars 76 are segmented, with one seal bar being provided for each blade root 74. Retainer wedges 79, disposed between each seal bar 76 and the arms 41 that extend axially upstream from the blade roots 74 and disc face 87, serve to retain the seal bars 76 in place. Set screws (not shown) secure the retainer wedges 79 to the upstream side plate 94, shown in FIG. 3.

As also shown in FIG. 5, the upstream seal ring 36 has a spigot 100. As shown in FIG. 3, the spigot 100 engages a slot 97 in the upstream disc face 87 so that the upstream seal ring 36 is also accurately located with respect to the disc 43.

As shown in FIG. 3, except for the portion that locally bears against the disc face 87 in the vicinity of the bolts 47, the upstream seal ring 36 does not contact the disc face and, in fact, a cavity 103 is formed between these two components. Thus, the upstream seal ring 36 not only forms passages 54, discussed below, that allow the heated cooling air to be isolated from the disc face 87, thereby preventing convective heating of the disc, it also has minimal contact with the disc face 87 so as to prevent conducive heat transfer from the seal ring 36 to the disc. Thus, the upstream seal ring serves to thermally isolate the disc from the heated cooling air.

As also shown in FIG. 3, in the preferred embodiment of the invention, axial holes 59 are provided in the upstream seal ring 36. The holes 59 allow a portion of the cooling air flowing through passage 53 to flow upstream under the blade root 74, radially inward into the cavity 103 and over the upstream disc face 87, and then to the passage 54. This portion of the cooling air bypasses the blade 71 cooling passages, thereby avoiding excessive heating of the cooling air, and thus provides effective cooling of the upstream disc face 87.

From the seal bar passages 86, the heated cooling air 29 flows through passages 54 formed in the upstream seal ring 36, as shown in FIG. 3. From the passages 54, the heated cooling air 29 from the second row enters the cavity 62 where it mixes with the heated cooling air 27 from the third row so as to form a combined heated cooling air stream 32.

Returning to FIG. 2, from the cavity 62 the combined flow of heated cooling air 32 flows through the first row disc 42 via cooling air passages formed in hollow bolts 48 that secure the upstream and downstream seal rings 38 and 37, respectively, to the first row disc 42. From the bolt cooling passages, the combined heated cooling air 32 flows into a cavity 61.

Turning now to the cooling of the first row, the cooling air 30 for the first row flows through the space between the first and second row discs, 42 and 43, and then through holes 90 formed in the upstream arm 78 of the second row disc 43, as shown in FIG. 3, as well as holes in the downstream arm of the first row disc 42. As shown in FIG. 2, from these holes, the cooling air 30 then flows through a passage 55 formed by the second row downstream seal ring 37, through the blade 70, and then out the second row upstream seal ring 38 in a manner similar to that discussed in detail above with respect to the second row cooling. From a passage 56 in the upstream seal ring 38, the heated first row cooling air 31 is discharged into the cavity 61 where it mixes with combined heated cooling air 32 from the second and third rows.

This further combined flow of cooling air is then discharged from cavity 61 to the chamber 14 that supplies the combustion air for the combustors 15 and from which the cooling air 20 was initially drawn, as previously discussed. Since in the preferred embodiment, none of the rotor cooling air 24 is intentionally discharged to the hot gas 12, substantially all of the cooling air 20 drawn from the chamber 14 is returned to it, except for leakages. Thus, the cooling scheme can be characterized as being closed loop, although it should be understood that a portion of the heated cooling air returned to the chamber 14 may enter the combustors 15 and, after combustion with the fuel 10, ultimately form the hot gas 12, rather than being returned to the turbine rotor 4 for cooling.

As a result of the effective use of cooling air by flowing cool cooling air over the disc faces and thermally isolating the disc faces from the heated cooling air discharged from the blades, the temperature of the disc is prevent from becoming excessive. Preferably, sufficient cooling is provided to allow the use of less expensive materials for the discs.

Although the present invention has been discussed with reference to the discs of a turbine rotor in a gas turbine, the invention is also applicable to other types of turbomachines in which the cooling of the rotating components is important. Accordingly, the present invention may be embodied in other specific forms without departing from the spirit or essential attributes thereof and, accordingly, reference should be made to the appended claims, rather than to the foregoing specification, as indicating the scope of the invention.

We claim:

1. A turbo-machine comprising a compressor for providing compressed fluid; a combustor for heating said compressed fluid; and a turbine rotor for expanding said heated compressed fluid, said turbine rotor having a plurality of discs and a plurality of blades having roots affixed to said discs, said blades having cooling passages formed therein for the passage of coolant;

means for providing a portion of said compressed fluid as coolant to a first side of each of said discs;

means for directing said coolant along a first side of each of said discs and into said cooling passages;

means for removing heated coolant from said cooling passages away from said discs;

means for isolating said heated coolant from said unheated coolant being provided to each of said discs; and, means for returning said heated coolant to said combustor.

2. The turbo-machine of claim 1, wherein said means for returning further comprises means for passing heated coolant from a first of said discs through a second of said discs.

3. The turbo-machine of claim 2, further comprising seal rings extending circumferentially around opposed sides of said discs and affixed to said discs by fasteners extending through said discs, said seal rings and the sides of said discs forming passages operable to direct said unheated coolant along the first sides of said discs to said blade cooling passages and to remove heated coolant from said blade cooling passages and away from said discs.

4. The turbo-machine of claim 3, wherein said fastener in a second of said disks further comprises a passage for moving heated coolant from a first of said discs through said second of said discs.

5. The turbo-machine of claim 4, wherein said blades are connected to said discs at a root section, and further comprising a means for directing a portion of said unheated coolant along said root section of each of said blades.

6. The turbo-machine of claim 1, wherein said discs comprise a low alloy steel.

7. The turbo-machine of claim 3, further comprising a cavity formed between at least a portion of one of said seal rings and said discs to thermally isolate said disc from said heated coolant.

8. A turbo-machine comprising:

a rotor having a plurality of discs;

a plurality of blades joined to said discs;

a plurality of blade cooling passages formed in said blades;

a means for providing unheated coolant to a first side of a first of said discs and through said blade cooling passages of a first of said blades to a second side of said first of said discs;

a passage formed in said first of said discs, said passage operable to permit a portion of said unheated coolant to pass through said disc to a first side of a second of said discs without passing through said cooling passages of said first of said blades;

seal rings extending circumferentially around opposed sides of said discs and affixed to said discs by fasteners extending through said discs, said seal rings and the sides of said discs forming passages operable to direct said unheated coolant along the first sides of said discs to said blade cooling passages and to remove heated coolant from said blade cooling passages and away from said discs;

wherein said fastener through said second of said discs further comprises a passage to permit heated coolant exiting said first of said blades to pass through said second of said discs;

and wherein said seal ring affixed to said first side of said second of said discs separates said unheated coolant being supplied to said first side of said second of said discs from said heated coolant exiting said first of said blades.

9. The turbo-machine of claim 8, wherein said blades are connected to said discs at a root section, and further comprising a means for directing a portion of said unheated coolant along said root section of each of said blades.

10. The turbo-machine of claim 8, wherein said discs comprise a low alloy steel.

11. The turbo-machine of claim 8, further comprising a cavity formed between at least a portion of one of said seal rings and said discs to thermally isolate said disc from said heated coolant.

* * * * *